United States Patent [19]

Kleineisel et al.

[11] Patent Number: 5,191,950
[45] Date of Patent: Mar. 9, 1993

[54] HYDROSTATIC TRAVELLING MECHANISM FOR TRACK-LAYING VEHICLES

[75] Inventors: Gustav Kleineisel, Mainaschaff; Horst Deininger, Hoerstein/Alzenau, both of Fed. Rep. of Germany

[73] Assignee: Linde Aktiengesellschaft, Wiesbaden, Fed. Rep. of Germany

[21] Appl. No.: 697,774

[22] Filed: May 9, 1991

[30] Foreign Application Priority Data

May 22, 1990 [DE] Fed. Rep. of Germany ....... 4016496

[51] Int. Cl.$^5$ ...................... B62D 11/04; B60K 17/00; F16D 31/02
[52] U.S. Cl. ...................... 180/6.3; 60/426; 180/307; 180/6.48
[58] Field of Search ............. 180/6.3, 6.48, 305, 180/307, 242; 60/421, 422, 423, 426

[56] References Cited

U.S. PATENT DOCUMENTS 3,807,174 4/1974 Wagenseil et al. ............ 180/6.48 X
4,722,186 2/1988 Louis et al. ..................... 60/426 X
5,005,358 4/1991 Hirata et al. .................... 60/426

Primary Examiner—Charles A. Marmor
Assistant Examiner—Florian Zeender
Attorney, Agent, or Firm—Thomas R. Shaffer

[57] ABSTRACT

A track-laying vehicle has two tracks, each with a hydrostatic drive unit, where at least one drive motor 1, 2 adjustable in working volume is provided in each drive unit and to which at least one pressure medium supply line 3, 4, 5, 6 connected to a hydrostatic pump leads and which has a working volume adjusting device 9, 11, 10, 12 that can be influenced by a signal dependent on the operating pressure. To avoid unintentional changes in direction of the track-laying vehicle in the case of different resistances to the tracks, it is proposed to connect the pressure medium supply lines 3, 4, 5, 6 of all the drive motors 1, 2 to a shuttle valve circuit 32, 33, 34 which determines the highest of the operating pressures of the hydrostatic drive unit and empties in a signal line 19 that is connected to the control elements of the working volume adjusting devices 9, 11, 10, 12 of all the drive motors 1, 2.

4 Claims, 2 Drawing Sheets

HYDROSTATIC TRAVELLING MECHANISM FOR TRACK-LAYING VEHICLES

BACKGROUND OF THE INVENTION

1. Field of the Invention

The invention concerns a hydrostatic travelling mechanism for track-laying vehicles, in which at least one motor adjustable in working volume is assigned to the tracks and to which at least one pressure medium delivery line connected to a hydrostatic pump leads and which has a working volume adjusting device that can be influenced by a signal dependent on the operating pressures, where the drive motors can be supplied with different quantities of pressure medium independently of each other.

2. Description of the Art

Such drive mechanisms are used, for example, as crawler drives in construction machinery. A hydrostatic drive unit with its own drive motor is usually assigned to each of the two track laying mechanisms. The travel motor can have a constant absorption volume or can be a variable displacement or regulating motor. With an identical transmission to both hydrostatic drive units the vehicle moves straight ahead. Different amounts of oil are delivered to the drive motors for cornering; this occurs in hydrostatic drive units in closed circuit by a different adjustment of the working volume of the adjusting pump assigned to each drive unit. In hydrostatic drive units in open circuit one or more variable displacement or regulating pumps supply the two drive units. The allocation of different oil quantities for the two drive units then takes place through multiway-acting valves. A speed change in the track-laying vehicle is effected by identical regulation of the two travel motors in both cornering and straight-forward travel. The working volume regulation of the travel motors can be effected by adjusting the operating pressure of the hydrostatic drive unit. Above a certain operating pressure, there is a transition from minimal to maximum absorption volume in the travel motor, by which the speed is decreased and the torque increased.

When vehicles equipped with such travelling gears are moved on rough ground, variable travel resistances usually arise at the two track-laying mechanisms or at the tracks. For example, if one of the tracks has to surmount an obstacle, its travel resistance increases and thus also the operating pressure in the assigned hydrostatic drive unit. This induces a working volume regulation of the travel motor of this drive unit and thus a transmission change in the direction toward a lower speed. The speed ratio of the two tracks is thus modified and the vehicle begins to move in a direction that is undesirable, which requires a corrective intervention by the driver. This is the case in both straight-forward travel of the vehicle and in cornering, by which such a vehicle is practically uncontrollable with regard to steerability.

SUMMARY OF THE INVENTION

The present invention proposes a travelling gear of the above type, which is suitable for track-laying vehicles.

This problem is solved according to the invention by connecting the pressure medium delivery lines of all drive motors to an operating pressure comparator, which generates a signal dependent on the operating pressure of the drive motor and the delivery lines with the maximum operating pressure of all the drive motors and all the delivery lines, which is provided for controlling the working volume adjusting devices of all the drive motors. The invention concept thus consists in the fact that the working volume adjustment of the drive motors is no longer controlled by a signal dependent on the operating pressure of the assigned hydrostatic drive unit, but the working volume adjusting device of both drive motors is controlled by a signal that is dependent on the highest of the operating pressures in the two drive units. The drive motors thus receive the same signal and are adjusted to the same control characteristic, independently of which of the tracks has the greater travel resistance. For example, the straight-forward travel of the vehicle is thus preserved. Only an identical speed reduction of both tracks caused by the increase in travel resistance and thus operating pressure takes place, with no change in the direction of travel. It is thus possible to utilize operating pressure-regulated adjusting motors for crawler drives.

The operating pressure comparator consists of a price-worthy and advantageous improvement in a shuttle valve circuit that empties into a signal line that is connected to the control elements of the working volume adjusting devices of all the drive motors. Instead of a shuttle valve circuit, an interconnection of the check valves can also be provided, which determines the highest of the operating pressures in the two hydrostatic drive units.

Drive motors in the form of motors regulated by the operating pressure (high pressure), as well as drive motors in the form of remote-controlled (by a control pressure) hydraulic motors can be used for a travelling gear of the invention type.

According to an advantageous implementation of the object of invention in a travelling gear with a drive motor of the former type (operating pressure-regulated motor), for example, a travelling gear whose drive motors each have a servo piston capable of sliding in an operating cylinder as the working volume adjusting device and which can be acted upon by pressure medium under operating pressure, where the supply of pressure medium to the operating cylinder by a control valve that is provided with a working chamber that can be acted on by a pressure medium under operating pressure. The signal line is connected to both the working chambers of the control valves and the operating cylinders of the drive motors. A travelling gear for track-laying vehicles is thus achieved by the simplest means, in which no undesirable cornering results in the case of a variable loading of the tracks.

In a travelling gear with a drive motor of the second type (hydraulically remote-controlled), e.g., a travelling gear whose drive motors have a servo piston displaceable in an operating cylinder as the working volume adjusting device and which can be acted upon by pressure medium that is under the regulating pressure, where the supply of pressure medium to the operating cylinder is regulated by a control valve that is provided with an operating chamber that can be acted upon by control pressure, it is provided in an expedient implementation of the object of invention for the operating chambers of the control valves to be connected to a common control pressure line that is connected with a control pressure medium source that is located beyond a throttle and which generates a constant or preselected control pressure, at least upstream from the throttle, which regulates the drive motor toward a smaller working volume, in which case a discharge line branches off from the control pressure line downstream from the throttle and in which a discharge valve throttling in intermediate positions is located. It is displaceable against an adjustable spring force in the opening direction and is provided with a working chamber connected to the signal line and is located in the working direction opposite the spring force. Despite the use of drive motors hydraulically remote-controlled by means of a control pressure, control characteristic curves can be achieved that are otherwise possible only when operating pressure-regulated drive motors are used.

The invention is elucidated in greater detail by means of the schematic figures described below in an exemplary embodiment with two variants.

DETAILED DESCRIPTION OF THE PREFERRED EMBODIMENT

Figure 1:
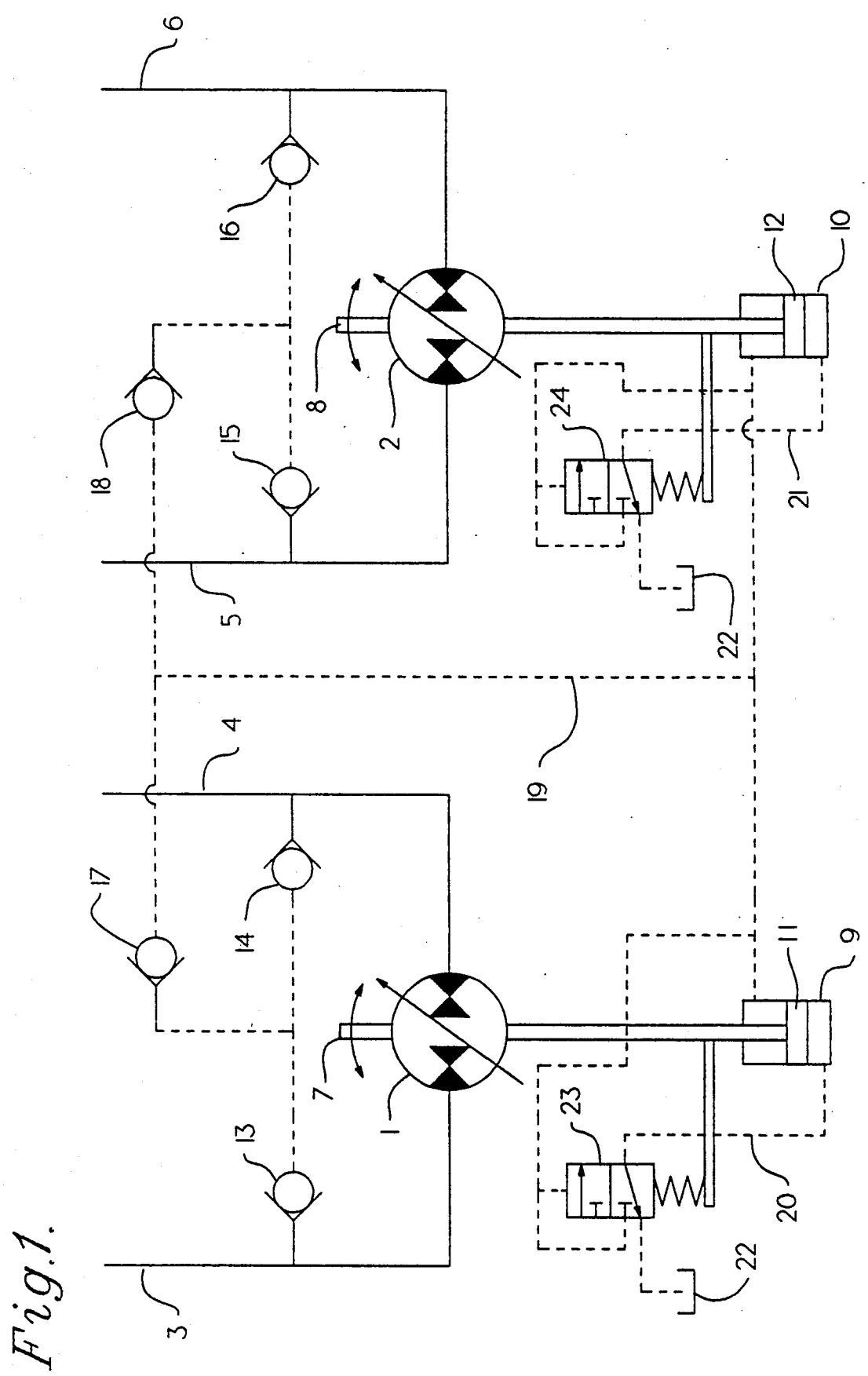
FIG. 1 shows a travelling gear with operating pressure-regulated drive motors.

FIG. 1 depicts two hydrostatic drive motors 1 and 2 of two hydrostatic drive units. The drive motors 1 and 2 are acted upon with pressure medium by one or more hydrostatic pumps (not shown) via the pressure medium delivery lines 3 and 4 as well as 5 and 6. A drive sprocket of a track is connected to each drive motor 1 or 2 through an output shaft 7 or 8, possibly with the interconnection of a mechanical transmission unit. The drive motor 1 or 2 is adjustable in working volume, which occurs through a working volume adjusting device, which consists of an operating cylinder 9 or 10 with a displaceable servo piston 11 or 12 in it and which can be acted upon from both sides and is in working connection with a control unit (not shown) of the drive motor 1 or 2.

The highest of the pressures in the pressure medium delivery lines 3, 4, 5 and 6 is determined via check valves 13, 14, 15, 16, 17 and 18 and fed into a signal line 19, which is branched and leads to the two operating cylinders 9 and 10. In the original position or with a lower operating pressure the servo pistons 11 and 12 are shifted downward in the Figure, which corresponds to an adjustment of the drive motors to a minimal working volume. When a certain pressure level is reached, the pistons are shifted upward in the Figure, which corresponds to an increase in the absorption volume. The pressure chamber, which increases with the upward movement of the servo pistons 11 or 12, is connected to a line 20 or 21, which is connected with the signal line 19. A control valve 23 or 24, throttling in intermediate positions, is located in the line 20 or 21; it is spring-loaded and has a working chamber against the direction of action of the spring, which is acted upon by the pressure in the signal line 19. When a certain pressure level is exceeded, the control valve 23 or 24 is shifted against the spring force and connects a branch line from the signal line 19 with the line 20 or 21, by which the servo piston 11 or 12 is acted upon in the opposite direction and due to the larger working surface is shifted upward in the Figure toward an increase in the working volume and thus a reduction in the speed of the output shaft 7 or 8.

By determining the highest operating pressure in the two hydrostatic drive units and conveying this signal through the signal line 19 both to the control valve 23 and the operating cylinder 9 of the drive motor 1 and to the control valve 24 and the operating cylinder 10 of the drive motor 2, both drive motors always have the same working volume setting.

Figure 2:
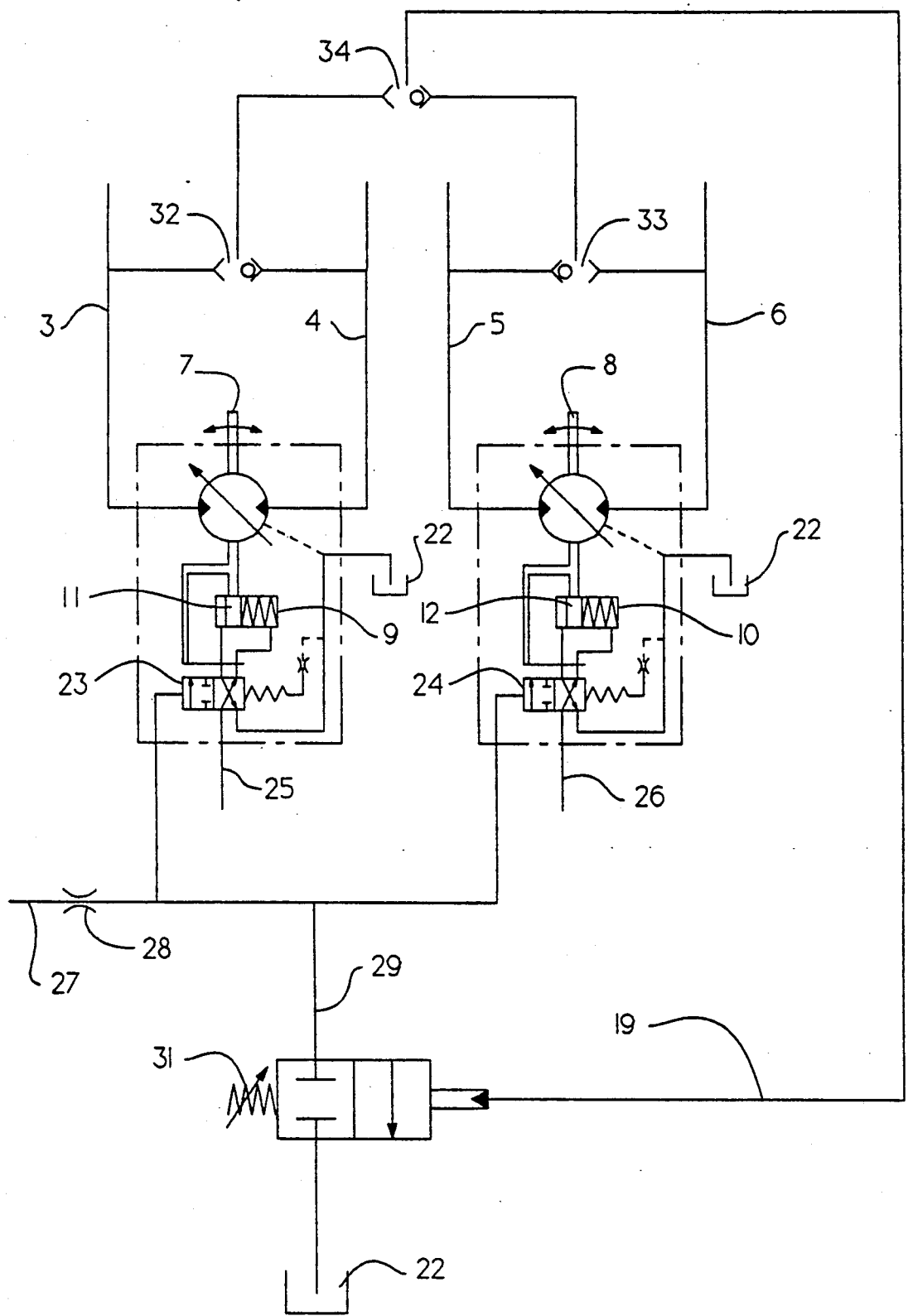
FIG. 2 shows a travelling gear with drive motors that can be remote-controlled hydraulically.

In FIG. 2 the same components are designated with the same reference numbers as in FIG. 1. Instead of check valves, shuttle valves 32, 33 and 34 are provided here. The servo piston 11 or 12 of the drive motor 1 or 2 can be acted upon from both sides. Depending on the setting of the control valve 23 or 24, the control pressure, which is removable from a line 25 or 26 and is generated and prepared in a suitable manner, can be conveyed to one of the two sides of the servo piston 11 or 12. The control valve 23 or 24 is controlled by acting upon a working chamber located at each control valve with a control pressure that is conveyed in a common control pressure line 27, which is provided with a throttle 28. The control pressure line 27 is connected to a control pressure medium source (not shown), which generates a control pressure at least upstream from the throttle 28, which shifts the control valves 23 and 24 so that the control pressure in the lines 25 and 26 effects a working volume reduction in the drive motors 1 and 2 with increasing control pressure. If the control pressure is variable, a certain travel speed can be preselected through its level, which corresponds to a matching intermediate position of the drive motors between minimum and maximum absorption volume. However, it is also possible to provide a constant control pressure, the level of which corresponds to a minimum absorption volume of the drive motors. If this control pressure can be disengaged, a swinging out of the drive motors to a maximum absorption volume and thus to a minimal drive speed is achieved.

A discharge line 29 is connected to the control pressure line 27 downstream from the throttle 28. It leads to a pressureless container 22 and a discharge valve 30 throttling in intermediate positions is located in it. The discharge valve 30 is spring force-loaded in the closure direction by a spring 31 that is adjustable with regard to force. In the opening direction the discharge valve 30 is provided with a working chamber connected to the signal line 19. The discharge valve 30 opens as a function of the maximum operating pressure in the signal line 19 and assures a more or less sharp reduction in the control pressure downstream from the throttle 28 and thus an increase in the working volume of the drive motors 1 and 2 by the same amount.

While certain presently preferred embodiments of the present invention have been described and illustrated, it is to be distinctly understood that the invention is not limited thereto but may be otherwise embodied and practiced within the scope of the following claims.

We claim:

1. Hydrostatic travelling gear for track-laying vehicles comprising at least two drive motors 1, 2; each said drive motor operably connected to the tracks of a track laying vehicle; each said drive motor operably connected to a hydrostatic pump by means of at least one pressure medium supply line 3, 4, 5, 6; each said drive motor being operably connected to an adjusting device 9, 11, 10, 12 to provide an adjustable working volume; each said adjusting device controlled by a control valve 23, 24 whereby the drive motors can be supplied with different amounts of pressure medium independently of each other; and operating comparator means connected to said at least one pressure medium supply line 3, 4, 5, 6 of each said drive motor 1, 2 for generating a control pressure dependent on the operating pressure of the drive motor 1, 2 and the supply line 3, 4, 5, 6 with the highest operating pressure of all the drive motors 1, 2 and all the supply lines 3, 4, 5, 6 to control the working volume adjusting devices 9, 11, 10, 12 of all the drive motors 1, 2 whereby the supply of pressure medium to the adjusting devices 9, 11, 10, 12 is controlled by said control valve 23, 24 being acted upon by pressure medium under operating pressure; and said control pressure is conveyed through a signal line 19 both to the control valves and adjusting devices of all the drive motors.

2. Hydrostatic travelling gear according to claim 1, wherein said operating pressure comparator means further comprises a shuttle valve circuit 32, 33, 34 and a signal line 19 connected to control elements of the working volume adjusting devices 9, 11, 10, 12 of all the drive motors 1, 2 wherein said shuttle valve circuit 32, 33, 34 empties in said signal line (19).

3. Hydrostatic travelling gear according to claim 2 wherein the adjusting device operatively connected to each drive motor further comprises a servo piston 11, 12 displaceable in an operating cylinder 9, 10 which can be acted upon by pressure medium under operating pressure, wherein the supply of pressure medium to the operating cylinder 9, 10 is controlled by a control valve 23, 24 having a control valve working chamber being acted upon by pressure medium under operating pressure, and wherein said signal line 19 is connected to both the working chambers of control valves 23, 24 and to the working chambers of servo piston operating cylinders 9, 10 of the drive motors 1, 2.

4. Hydrostatic travelling gear according to claim 2 wherein the adjusting device operatively connected to each drive motor further comprises a servo piston 11, 12 displaceable in an operating cylinder 9, 10 being acted upon by pressure medium under operating pressure, wherein the supply of pressure medium to the operating cylinder 9, 10 is controlled by a control valve 23, 24 having a control valve working chamber being acted upon by pressure medium under operating pressure, wherein the working chambers of the control valves 23, 24 are connected to a common control pressure line 27, which is connected to a control pressure medium source, said pressure line 27 having a throttle 28 therein and generating a control pressure, at least upstream from the throttle 28, to regulate the drive motors toward a smaller working volume, said pressure line 27 also having discharge line 29 therein which branches off from the control pressure line 27 downstream from the throttle 28, said discharge line having a discharge valve 30 therein, said discharge valve having a valve element displaceable against adjustable spring force in an opening direction and provided with a working chamber connected to the signal line 19 in the direction of action opposite the spring force.

* * * * *